United States Patent
Asano et al.

(10) Patent No.: US 6,820,045 B1
(45) Date of Patent: Nov. 16, 2004

(54) PROCESS ASSESSMENT TOOL, PROCESS ASSESSMENT METHOD, AND MEDIUM STORING THE METHOD

(75) Inventors: Takahiro Asano, Tokyo (JP); Narito Shibaike, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 740 days.

(21) Appl. No.: 09/710,242

(22) Filed: Nov. 10, 2000

(30) Foreign Application Priority Data

Nov. 12, 1999 (JP) .......................................... 11-322616

(51) Int. Cl.⁷ ................................................ G06G 7/66
(52) U.S. Cl. .............................................. 703/6; 702/1
(58) Field of Search .............................. 703/6; 700/97; 702/1, FOR 158

(56) References Cited

U.S. PATENT DOCUMENTS

| | | | |
|---|---|---|---|
| 5,852,560 A | * | 12/1998 | Takeyama et al. ............ 700/97 |
| 5,878,433 A | * | 3/1999 | Miyamoto .............. 707/103 R |
| 6,532,464 B1 | * | 3/2003 | Miyamoto .................... 707/10 |

* cited by examiner

*Primary Examiner*—Albert W. Paladini
(74) *Attorney, Agent, or Firm*—RatnerPrestia (57) ABSTRACT

A process assessment tool and a process assessment method are disclosed to allow a design of a manufacturing process to reduce environmental loads. The process assessment tool comprises: a data input unit having a section data input, a step data input, and a consumed material input; a data processing unit connected to an electric power environmental load database, a fossil fuel environmental database, and a material environmental database; and a display unit providing a cumulative graph, a pie graph, and a radar chart. Environmental loads including energy consumption, carbon dioxide, sulfur oxides, nitrogen oxides and others are calculated with data entered at the data input unit and data from the databases connected to the data processing unit. Displaying the calculation in a visual form at the display unit provides the design of the manufacturing process with the useful information, and allows the design to reduce environmental loads of the manufacturing process.

39 Claims, 11 Drawing Sheets

Step data

- Step classification code — 19
- Sup No — 20, Step No. — 23, Step code — 22 (also labeled 21)
- Step name
- Yield — Processing temperature °C
- Step category
- Processing time min — Products per one hour unit
- Direct or Indirect: ☑ Direct energy (for production equipment) ☐ Indirect energy (for light, air conditioning)
- Section select

Electric power data

- Rated power — 0 kW — 25
- Duty factor — 1 — 26
- Ratio to full power — 1 — 27
- Cogeneration use ● No ○ Yes — 28

Non-electric power data — 29

- Natural gas — 0 m3/yr    Coal — 0 kg/yr
- Light oil — 0 kg/yr    Wood — 0 kg/yr
- Heavy oil — 0 kg/yr    Gasoline — 0 kg/yr Note

FIG. 4

Consumption material data

Step code: AA001-00 — 31

Material used: ——— 33

Consumption: 100  kg/ Hour — 35
         34

Place:

☑ Direct material (To remain in final product)
☐ Indirect material (Not to remain in final product)
☐ Material for process (Needed to keep process)

| | | | |
|---|---|---|---|
| CO2 emission | 1928 g/kg | CO emission | 0.1114 g/1kg |
| NOX emission | 6.214 g/kg | N2O emission | 0.1831 g/1kg |
| SOX emission | 2.182 g/kg | CxHy emission | 0.1182 g/1kg |
| CH4 emission | g/kg | HF emission | 1.94E-0.5 g/1kg |
| HCL emission | g/kg | Dust emission | 0.3327 g/1kg |
| GWP20 | g/kg | GWP100 | |
| AP | g/kg | NP | |

— 36

| | |
|---|---|
| AA001-00 | L - Carrier loader |
| AA002-00 | Inspection |
| AA003-00 | L1-Casset L/D |
| AA004-00 | 2-Dry cleaning |
| AA005-00 | 3-1 Laser Merker |
| AA006-00 | U1-Casset I/L |
| AA007-00 | L2-Casset L/D |

— 30

| Polymer | Metal | Ceramics | Natural | Chemical |
|---|---|---|---|---|
| ABS | | | | |
| AN | | | | |
| AS | | | | |
| B/PET | | | | |
| EP | | | | |
| EPS | | | | |
| Epoxy | | | | |

1) Emissions by electricity (per 1kWh)

| Electric power Co. | Emissions | | |
|---|---|---|---|
| | $CO_2$ (g/kWh) | SOx (g/kWh) | NOx (g/kWh) |
| A Co. | 490 | 0.98 | 0.84 |
| B Co. | 570 | 0.60 | 0.63 |
| C Co. | 380 | 0.53 | 0.45 |
| D Co. | 480 | 0.50 | 0.38 |
| E Co. | 470 | 0.43 | 0.42 |
| F Co. | 330 | 0.31 | 0.32 |
| G Co. | 770 | 0.54 | 0.55 |
| H Co. | 370 | 0.83 | 0.46 |
| I Co. | 500 | 0.34 | 0.51 |
| J Co. | 1000 | 2.00 | 1.40 |

2) Emissions by natural gas (per $1Nm^3$)

| ($g/Nm^3$) | ($g/Nm^3$) | ($g/Nm^3$) |
|---|---|---|
| 2290 | 1.29 | 2.34 |

PROCESS ASSESSMENT TOOL, PROCESS ASSESSMENT METHOD, AND MEDIUM STORING THE METHOD

FIELD OF THE INVENTION

The present invention relates to a process assessment tool and a process assessment method evaluating a load a manufacturing process for industrial products puts on the environment, and a storage medium storing the method.

BACKGROUND OF THE INVENTION

At present, environmental consideration has been very important in a manufacturing process for industrial products. Electrical energy is mainly used as power source or heat source, so-called secondary energy, in current production plants. In addition, design of manufacturing process has usually placed emphasis on cost reduction in industry.

But, recently, there has been a growing interest in global environmental preservation. Therefore, it is indispensable that reduction of energy consumption and reduction of emissions of global warming gases and acidification gases are considered simultaneously.

As a result, it is important for a planned process or a current process: to perform simulation namely process assessment of an impact i.e. a load the process may put on the environment; to extract problems from the process; and to consider measures for improvement.

A cogeneration system (Hereinafter cogeneration system is referred to as SYSTEM.) is a system providing a part of electrical energy necessary for production from a private power generator using gas or oil. Furthermore, use of waste heat from the power generator will allow the system to reduce energy consumption. A total energy conversion efficiency of SYSTEM using gas as fuel is usually 70 to 80%, so that an environmental load is expected to lower by using SYSTEM.

But, in the manufacturing process, it was usually difficult to optimize a ratio between power purchased and power produced by the private power generator.

Factors of the environmental load are described, for example, as follows:
  i) an energy amount which is used to produce secondary energy such as electricity and town gas used for a manufacturing process by using primary energy such as natural gas, heavy oil, light oil, lamp oil, gasoline, coal, and wood;
  ii) an emitted amount of environmental load materials such as carbon dioxide ($CO_2$), nitrogen oxides (NOx), sulfur oxides (SOx), which are produced when the secondary energy is generated and utilized by using the primary energy.

But, a method of power generation namely a power source construction varies depending on a difference among electric power companies (supplier), and a difference among areas electric power is supplied to (service area). Therefore, amounts of environmental load emissions and the component percentages also vary according to an electric power company and an area electric power is supplied to.

If the environmental load of manufacturing process will actually be calculated, it would be difficult for the load to be correctly calculated, because so many factors of the load are combined each other in complexity.

On the other hand, for an environmental load of manufacturing process to be improved, it is necessary that an environmental load of each step (operation or process), which constitutes a manufacturing process, should be considered. But, many manufacturing processes have more than 100 steps. Components of a product could be often manufactured in a variety of plants. This as well makes an assessment of an environmental load difficult.

SUMMARY OF THE INVENTION

The object of the present invention is to assess a real manufacturing process, and provide a process assessment tool, which allows a process design aiming at lowering an environmental load.

First, to accomplish the object, a tool is necessary for a process assessment of the present invention assessing a load a manufacturing process for an industrial product puts on the environment. The tool comprises the following elements:
  (a) a database storing data of a first environmental load corresponding to each energy source, whose consumption produces the first environmental load;
  (b) a data input unit, into which data of condition of the manufacturing process for the industrial product is entered;
  (c) a data processing unit calculating a second environment load the manufacturing process for the industrial product produces, by using the data entered into the data input unit and the data stored in the database; and
  (d) a data output unit for outputting a result calculated by the data processing unit.

Second, a method for a process assessment for an industrial product of the present invention. This method assesses a load a manufacturing process puts on the environment, by using a database storing data of an environmental load corresponding to each energy source, whose consumption produces the environmental load. The method comprises steps of:
  (a) inputting a condition of the manufacturing process for the industrial product;
  (b) calculating a second environmental load the manufacturing process for the industrial product produces, by using the condition of the manufacturing process and data of a first environmental load included in the database; and
  (c) displaying a result the step (b) calculates.

Third, a storage medium storing a program a computer runs to perform the method.

The tool, the method, and the storage medium of the present invention provide useful information to a manufacturing process design, which aims to reduce an environmental load of manufacturing process, and contribute to accomplish the object.

DESCRIPTION OF THE PREFERRED EMBODIMENTS

An assessment of an environmental load of a manufacturing process is performed for a real manufacturing process with a tool and a method for a process assessment of the present invention. Furthermore, to make possible a manufacturing process design, which aims to reduce an environmental load of manufacturing process, the present invention performs an analysis on energy with various conditions considered, and makes an adequate simulation possible.

Hereinafter, preferred embodiments of the invention are described with reference to the accompanying drawings.
(First Embodiment)

Figure 1:
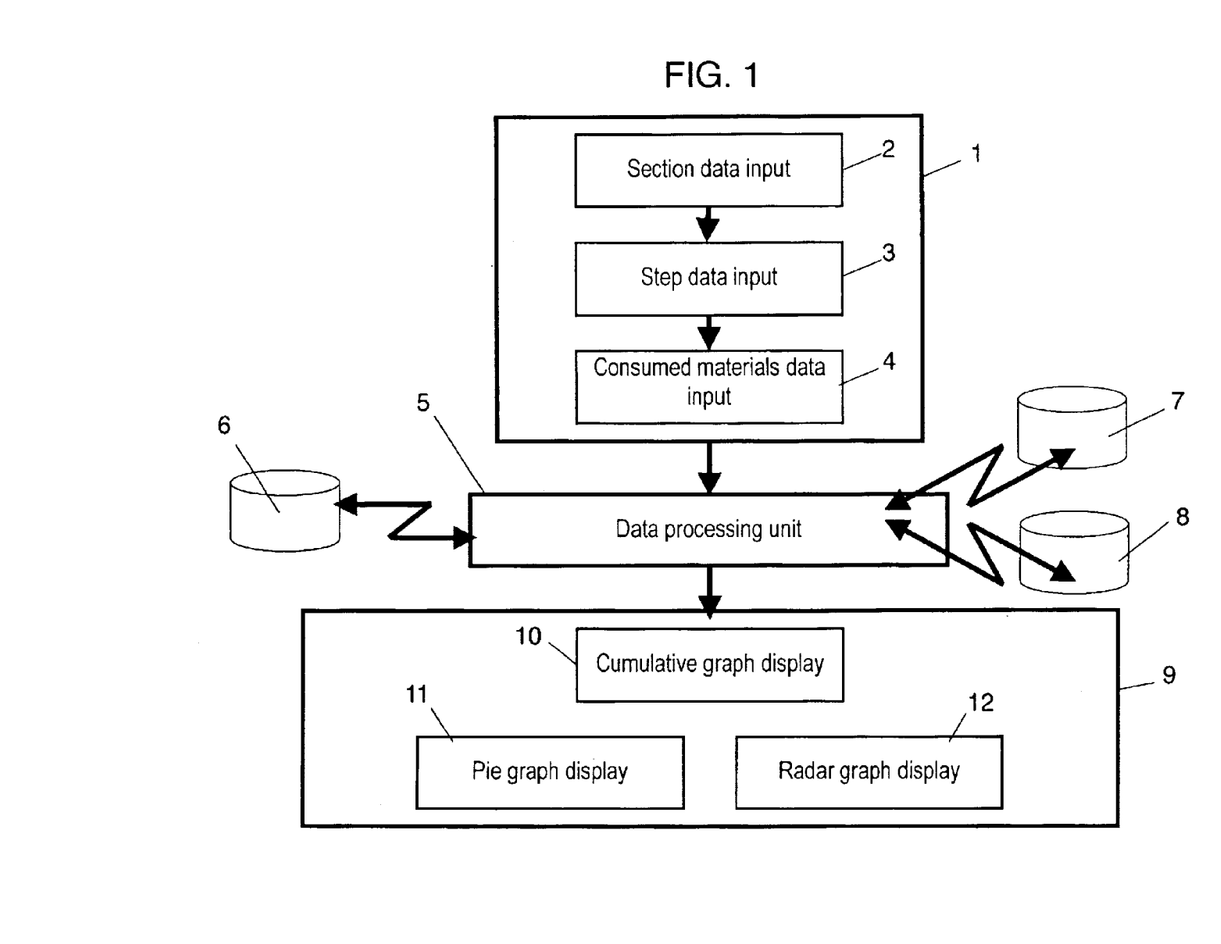
FIG. 1 is a block diagram illustrating a process assessment tool in accordance with a first preferred embodiment of the present invention.

FIG. 1 is a block diagram illustrating an outline of a process assessment tool in accordance with the present invention. Data input unit 1 comprises section data input 2, step data input 3, and consumed material data input 4, where "section" refers to a place where manufacturing is performed, and "step" means individual operation or process which constitutes a manufacturing process.

A condition of a section is entered at section data input 2. Conditions of a section relate to conditions of a place where manufacturing is performed, includes production conditions such as working days, working time, the yields, energy necessary for the process. This is described below. A condition of a step is entered at step data input 3, Conditions of a step relate to conditions of individual operation or process in a manufacturing process of industrial produce includes product processing conditions such as processing temperature, processing time, quantity of product to be processed, energy necessary for the process. Necessary information for calculation about a consumed material is entered at consumed material input 4. Necessary information for calculation regarding a consumed material includes the kind of materials that are used and the amount of a material that is consumed.

Data processing unit 5 is connected to electric power environmental load database 6, fossil fuel environmental load database 7, and material environmental load database 8.

Electric power environmental load database 6 has: i) power source data collected based on one of energy supplier basis and energy service area basis (power source data means data on energy source for producing electricity, such as oil, coal, atomic energy and water energy); and ii) data of an environmental load constructed on power generation source basis (data of an environment load means amounts of $CO_2$, NOx, SOx, dust and so on, emitted by each electric power source.) As an example, it may be said that, producing electric power with oil, one kilo litter make $CO_2$, one kg emitted. Then, $CO_2$, one kg is an environmental load which we have when we get electricity.

Fossil fuel environmental load database 7 has data as environmental load factor, as follows:

i) an energy amount which is used to produce secondary energy such as electricity and town gas used for a manufacturing process by using primary energy such as natural gas, heavy oil, light oil, lamp oil, gasoline, coal, and wood. An energy amount is obtained from documents published by electric power supply companies and gas supply companies, or research papers on environmental loads.

ii) an emitted amount of environmental load materials such as carbon dioxide ($CO_2$), nitrogen oxides (NOx), sulfur oxides (SOx), which are produced when the secondary energy is generated and utilized by using the primary energy. An emitted amount is obtained from documents published by electric power supply companies and gas supply companies, or research papers on environmental loads. Also, it is obtained from environment-related commercial databases such as "BUWAL".

Material environmental load database 8 has:

i) data of environmental load produced from stages from mining to use of a material, corresponding to the material used for manufacturing (data of environmental load comes from environment-related commercial databases such as "NIRE-LCA ver. 2" and research papers.); and ii) data of environmental load produced by a cause that material is consumed.

Data processing unit 5 performs calculating and processing with each information entered at data input unit 2, and data from electric power environmental load database 6, fossil fuel environmental load database 7, and material environmental load database 8. Data output unit 9 receives the result of the processing, and performs displaying cumulative graph 10, pie graph 11, and radar graph 12.

There are specific input items for section data input 2, step data input 3, and consumed material data input 4, as follows.

When an operator selects an item, the operator selects one item from a pull down menu, or one of checkboxes.

The operator enters a numerical value, a symbol, a word, a sentence and other specific information into their respective input fields.

1) Section Data Input 2

Figure 2:
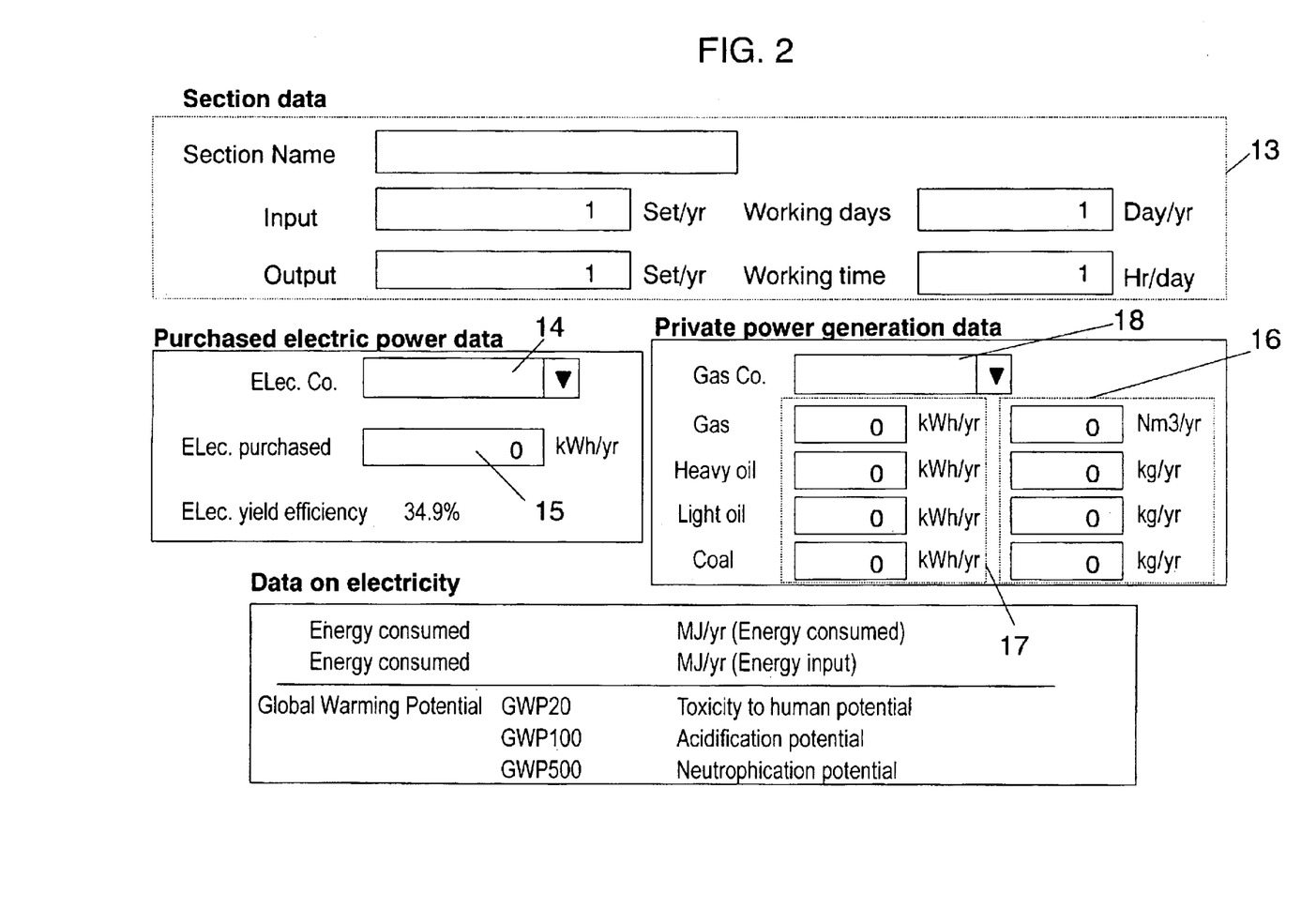
FIG. 2 illustrates a layout and an operating state of an input screen for section data in accordance with the first embodiment of the present invention.

FIG. 2 illustrates an input screen, with which an operator enters data of a manufacturing place (section) for an arbitrary step of a manufacturing process in the same electric power supply system. As mentioned before, "step" refers to an individual operation or process which constitutes a manufacturing process. Information entered here includes, production condition 13 including operating time, electric power company 14, amount of electric power purchased 15, amount of fossil fuel 16 for a private power generation, amount of generated electricity 17 by the private power generation, and gas company 18. On the basis of contents entered above, the process assessment tool makes access to built-in electric power environmental load database 6, fossil fuel environmental load database 7, and material environmental load database 8. Then, the tool calculates environmental load amount of $CO_2$, NOx, SOx and other emissions and wastes according to power electric company 14 and gas company as energy sources, and amount of electric power purchased 15 and amount of fossil fuel used 16.

2) Step Data Input 3

Figure 3:
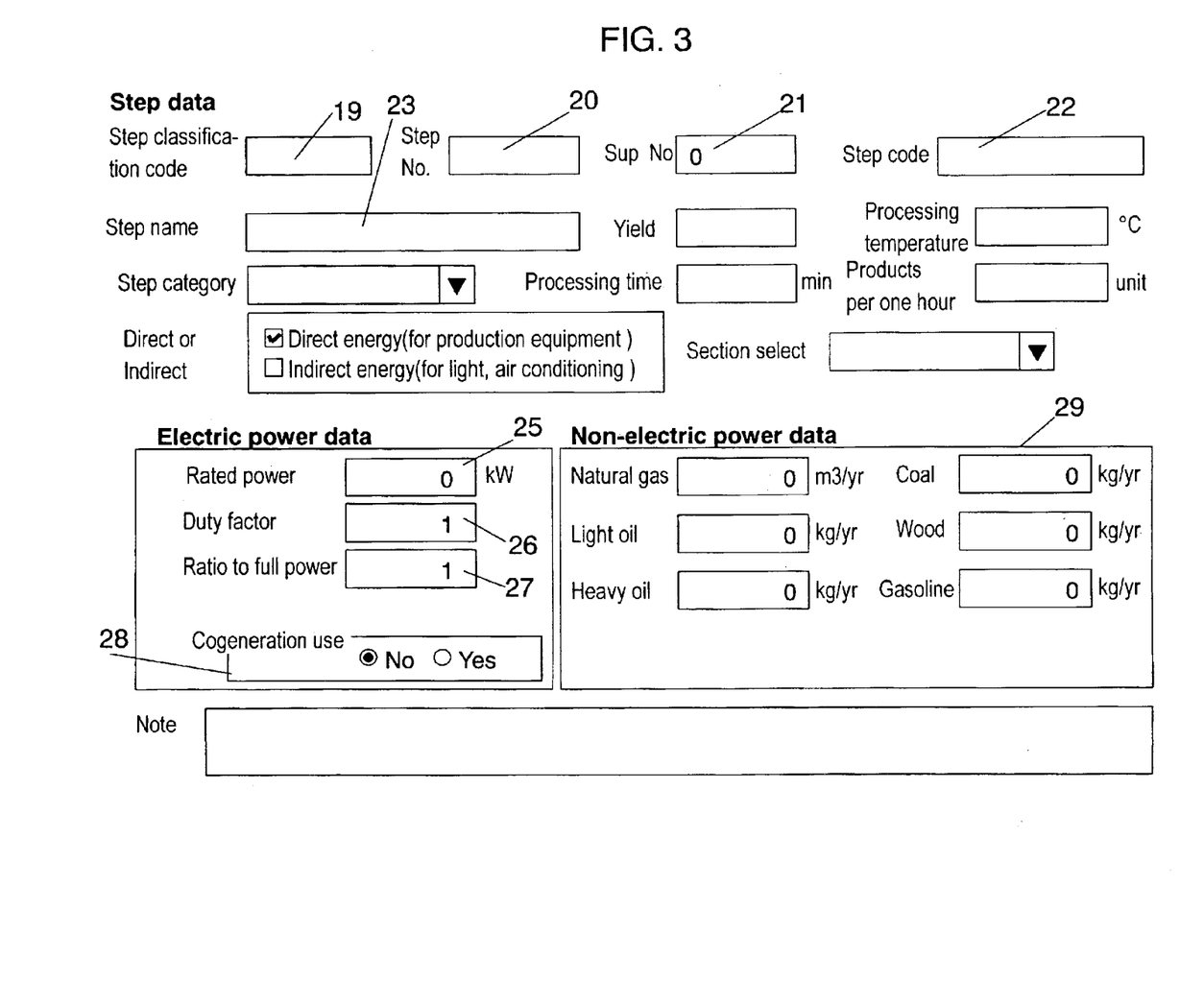
FIG. 3 illustrates a layout and an operating state of an input screen for manufacturing process step data in accordance with the first embodiment of the present invention.

FIG. 3 is an illustration of an input screen, with which the operator enters a condition for an arbitrary step of a manufacturing process.

After the operator enters step classification code 19, the process assessment tool displays automatically step number 20, supplementary number 21, and step code 22. Then, the operator enters step name 23 and an applicable class a process of the step fits into in the field of step classification 24.

Each step uses manufacturing facilities. It is very difficult to know electric power consumption for individual piece of facilities in a real plant. Therefore, rated power 25, duty factor 26, and ratio to full-power 27 for each device in each step are entered. Then, an effective value of power consumption for each step (not shown in the figure) using applicable devices is estimated.

Next, power consumption for each step (not shown in the figure) is calculated from: a ratio of an individual effective value of power consumption for the step to a sum of effective values for the same section; and a total of an amount of electric power purchased 15 for the section in FIG. 2 and an amount of generated electricity 17 of a private power generation. Furthermore, if data is entered in the field of amount of generated electricity 17 in FIG. 2, the operator selects "used" of SYSTEM use situation from "used" and "unused" in the box of cogeneration used 28 in the input screen in FIG. 3 to enter conditions of steps. The operator enters an amount of fossil fuel used in each step individually, in the box of power other than electricity 29.

3) Consumed Material Data Input 4

Figure 4:
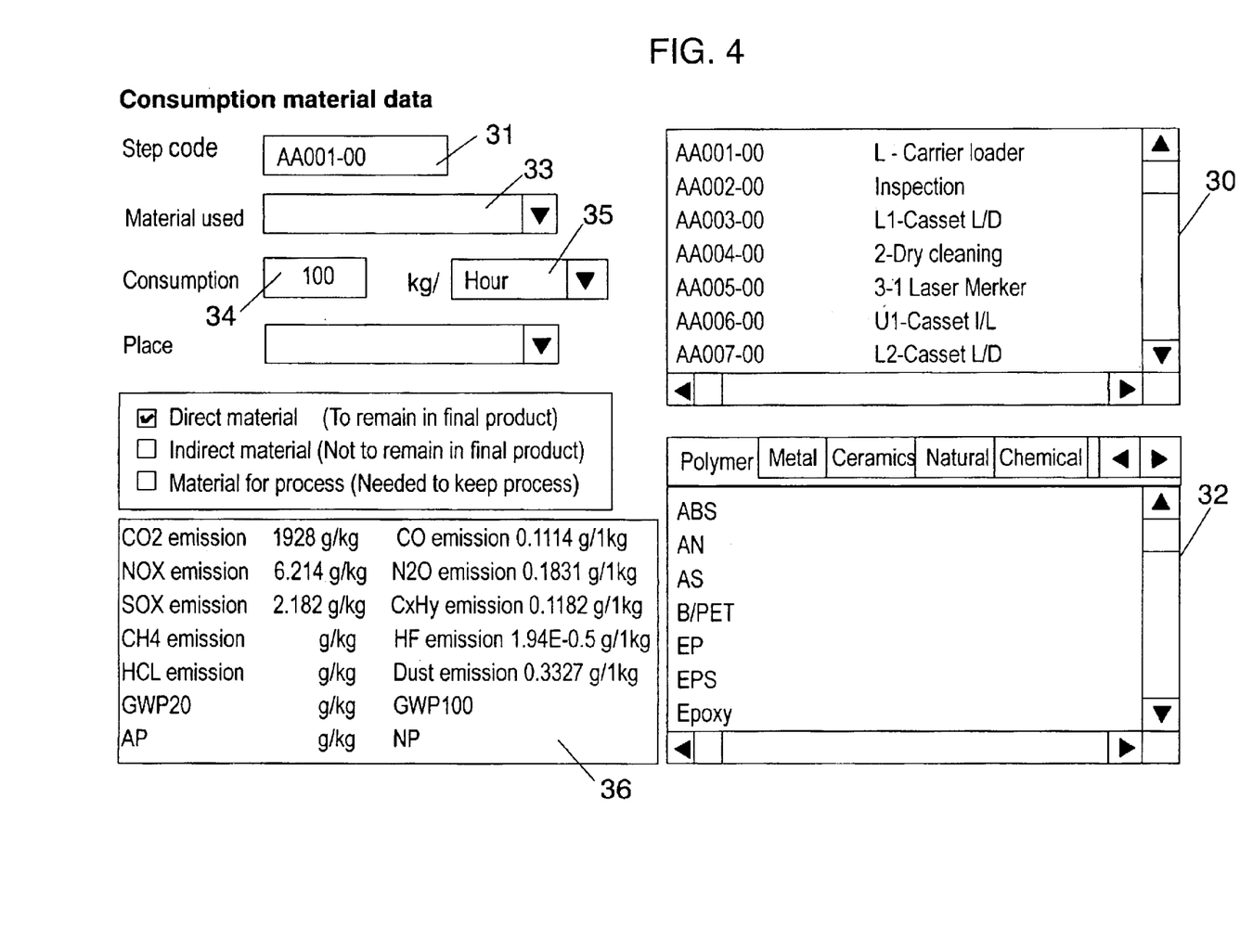
FIG. 4 illustrates a layout and an operating state of an input screen for consumed material in accordance with the first embodiment of the present invention.

FIG. 4 illustrates an input screen, with which the operator enters information about a material consumed (used) in each step. The operator enters an applicable step name code, which is one of codes displayed in the box of step code table 30, in the field of step code 31. Next, the operator selects an applicable material from the box of material environmental load database 32 and enters the material in the field of material used 33. The operator enters consumption of the material at the target step in the field of consumption 34 and unit as standard in the field of unit 35. After the operations, the process assessment tool calculates amounts of the emissions and wastes per unit weight of the material used, and displays them in the box of emitted material display 36.

After operations of the articles 1), 2), and 3) mentioned above, the process assessment tool calculates and processes data prepared above in the fields and others into energy consumption of each step and amounts of emissions. Data processing unit 5 makes the calculation based on a predetermined equation, using the data input from, 1) section data input 2, 2) step data input 3 and 3) consumed material data input 4; and the data stored in electric power environmental load database 6, fossil fuel environmental load database 7 and material environmental load database 8. Relations among data input by the inputs 2, 3 and 4; and the data coming from the databases 6, 7 and 8 provide environmental loads at each "step". This calculation result makes clear which step emits the highest level environmental load and allows comparison among numerical values of the loads to be possible.

Figure 5:
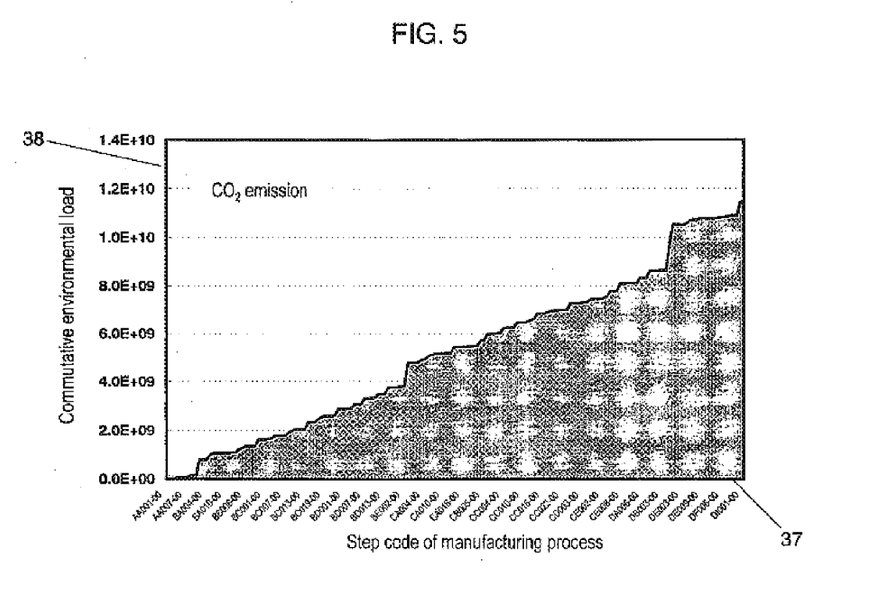
FIG. 5 illustrates a layout and an operating state of an output screen displaying a cumulative graph in accordance with the first embodiment of the present invention.

Next, to make consideration on reduction of environmental loads of the manufacturing process more efficient, a cumulative graph display illustrated in FIG. 5 is used. In the figure, the horizontal axis shows step code 37 corresponding to each step, and the vertical axis shows cumulative environmental load 38, which is the integral of the environmental load with respect to step code 37, where the environmental loads are energy consumption, $CO_2$, NOx, SOx, and others. FIG. 5 is an example that the vertical axis is $CO_2$ emission.

This makes clear which step increases the environmental load more steeply than other steps, showing a ratio of a specific step's $CO_2$ emission to total $CO_2$ emission, and makes clear which step should reduce $CO_2$ emission. There is another utility. A ratio of the environmental load until specific step to the total environmental load provides consideration about reuse or recycle with some information for a plant to decide the specific step, from which reuse or recycle should be started.

Figure 6:
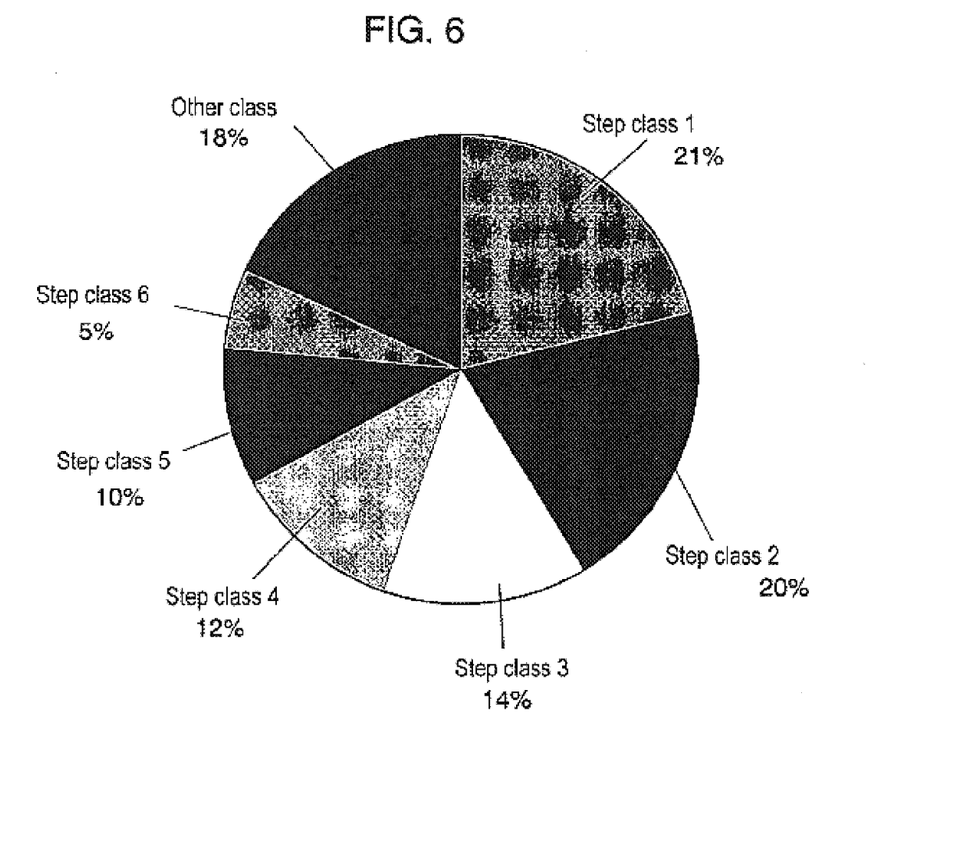
FIG. 6 illustrates a layout and an operating state of an output screen displaying a pie graph in accordance with the first embodiment of the present invention.

Furthermore, to make consideration on reduction of environmental loads of the manufacturing process more efficient, a circular split graph display illustrated in FIG. 6 is used. This graph illustrates ratios of environmental loads of step classes to the total environmental load. Environmental load of this figure is calculated from energy consumption, and emissions such as $CO_2$, NOx, and SOx.

This makes clear which step class has the highest environmental load.

With similar plural steps combined into a step class, this result is reflected to a manufacturing process design required to consider reduction of environmental load.

Figure 7:
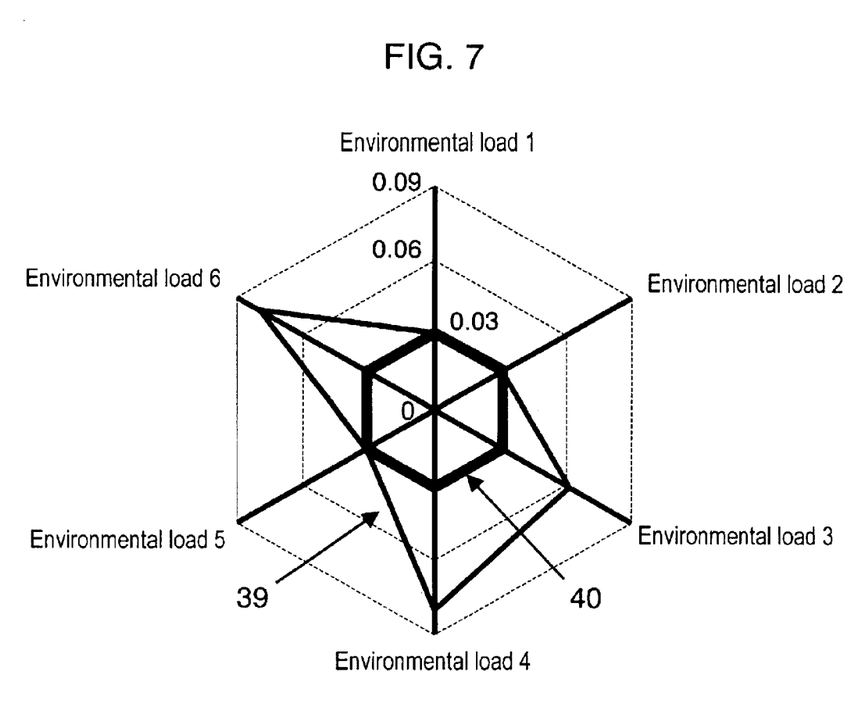
FIG. 7 illustrates a layout and an operating state of an output screen displaying a radar graph in accordance with the first embodiment of the present invention.

Furthermore, to make consideration on reduction of environmental loads of each step in the manufacturing process more efficient, a radar graph display illustrated in FIG. 7 is used. The radar graph has plural radial axes, which are corresponding to plural environmental load factors respectively. Ratios of environmental loads of the environmental load factors in a target step to the total environmental load of environmental load factors in the manufacturing process are plotted on the axes respectively. Here, the environmental load factors are energy consumption and amounts of $CO_2$, NOx, SOx, and other emissions. Step environmental load line 39 consists of lines connecting the adjacent plots. When the target step uses only electric power purchased, the ratio of a environmental load of a environmental load factor in a target step is similarly plotted, and the lines connecting the plots similarly makes purchased electricity environmental load line 40. Therefore, if all energy the manufacturing process consumes is electric power purchased, step environmental load line 39 and purchased electricity environmental load line 40 overlap one another. If SYSTEM uses a private power generation, step environment load line 39 deviates from purchased electricity environmental load line 40. Line 39 deviating from line 40 to outer side shows that the environmental load factor plotted should be improved.

This graph makes each situation of plural environmental load factors clear. This result is useful for a course of reduction of an environmental load in each step to be devised. If this operation is performed for all steps, information for reduction of environmental loads of all processes can be obtained.

Furthermore, with these methods stored as a software program, running the program on a computer produces the same functions and advantages.

(Second Embodiment)

An embodiment relating to a design of a manufacturing process is described. A manufacturing process is going to use a SYSTEM (cogeneration system), and the design aims at reduction of environmental load by using this process assessment tool of the present invention. The embodiment assumes as follows. Total electric power the manufacturing process requires is 1000 kWh. The electric power the process requires consists of electric power purchased and electric power from private power generation using gas. The process can directly use thermal energy 25% of all energy.

Conditions of SYSTEM are: the private power generation uses natural gas; generation efficiency is 30%; and a 40% of waste heat is used. The embodiment investigates a carbon dioxide ($CO_2$) emission as an environmental load material emitted in the case that SYSTEM is used. Carbon dioxide ($CO_2$) is one of environmental load materials and is one of global warming materials. Therefore, it is urgently required to be reduced.

Meanwhile, the embodiment does not consider initial investment for construction of facilities and others.

Figure 8:
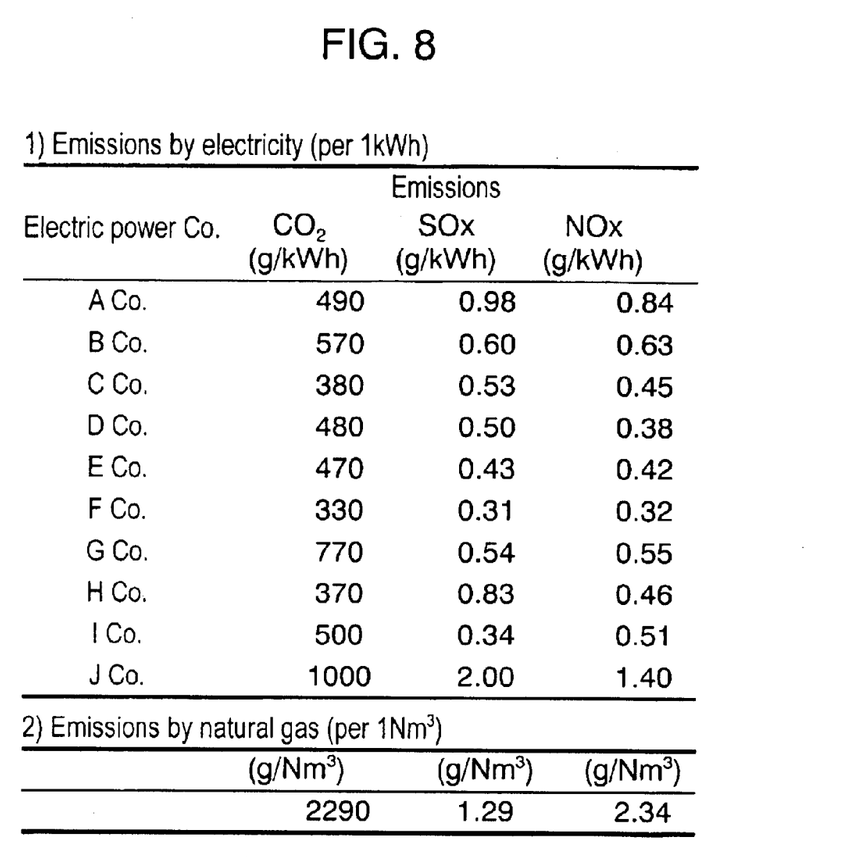
FIG. 8 shows main emissions emitted when each electric power company generates electricity, and other main emissions emitted from all stages from mining to use of natural gas.

There is a report about consideration and calculation result of $CO_2$ and other environmental load materials such as sulfur oxides (SOx) and nitrogen oxides (NOx) produced by power plants of electric power companies. FIG. 8 indicates the result. (References: Matsuno et. al., The Journal of The Institute of Energy of Japan, 77(12), 1162(1998)) There is another report about emissions from all stages from mining to use of natural gas. FIG. 8 indicates it, too. (References: BUWAL250 Environmental Series No. 250 Life Cycle Inventories for Packaging, Swiss Agency for the Environment, Forests and Landscape (SAEFL), Bern, Switzerland (1998))

Figure 9:
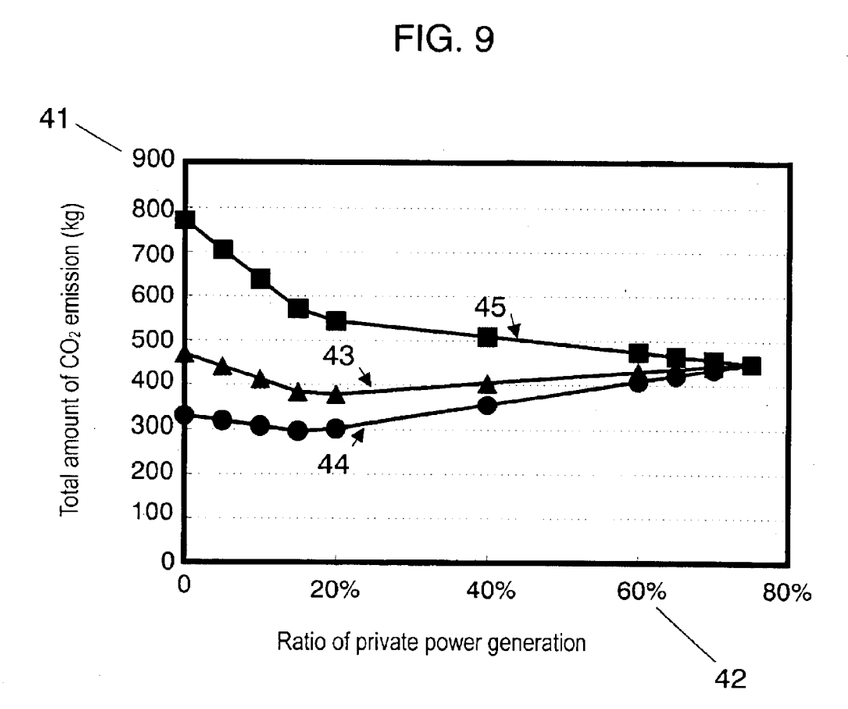
FIG. 9 shows $CO_2$ emissions which are compared with a ratio of power of a private generation to power supplied from each of the three electric majors into a cogeneration system.

FIG. 8 shows that $CO_2$, SOx, and NOx emissions vary depending on the electric companies. FIG. 9 indicates a $CO_2$ emission which SYSTEM produces using waste heat□from a private power generation, and the $CO_2$ emission is estimated with the $CO_2$ values of E, F, and G companies and natural gas shown in FIG. 8.

In FIG. 9, the longitudinal axis shows total amount of $CO_2$ emission 41 calculated with a ratio of private power generation, and the horizontal axis shows ratio of private power generation 42 referring to the ratio of private power generation.

In the figure, curves 43, 44, and 45 show $CO_2$ emissions from SYSTEM using power companies E, F, and G respectively. It shows that if any electric company is used for SYSTEM, it is useful to use this SYSTEM for reducing $CO_2$. Curve 45 of company G shows that $CO_2$ is reduced with increasing the ratio of private power generation. But, curves 43 and 44 have minimum points, accordingly, after the ratios pass by the points, $CO_2$ emissions of the two companies increase respectively.

The minimum point appears at a ratio of private power generation, where used waste energy from the private power generation is equal to thermal energy which can be used directly at the manufacturing process.

In comparison of the data between companies E and F which SYSTEM put to use, a decrease of $CO_2$ emission until the minimum point on E company's curve 43 is higher than that on F company's curve 44. Therefore, it is preferable that SYSTEM put company E to use positively.

When SYSTEM puts company F to use, a decrease of $CO_2$ emission until the minimum point on company F's curve 44 is not so high, but an increase rate of $CO_2$ after the minimum point is high. Therefore, it is shown that when the manufacturing process purchases electric power from company F, the private power generation should not produce higher electric power than an amount the manufacturing process can directly consume.

SOx and NOx emissions have the same tendencies as $CO_2$ emission. Next, FIG. 10 shows a result in consideration of SOx emission with the assessment tool.

Figure 10:
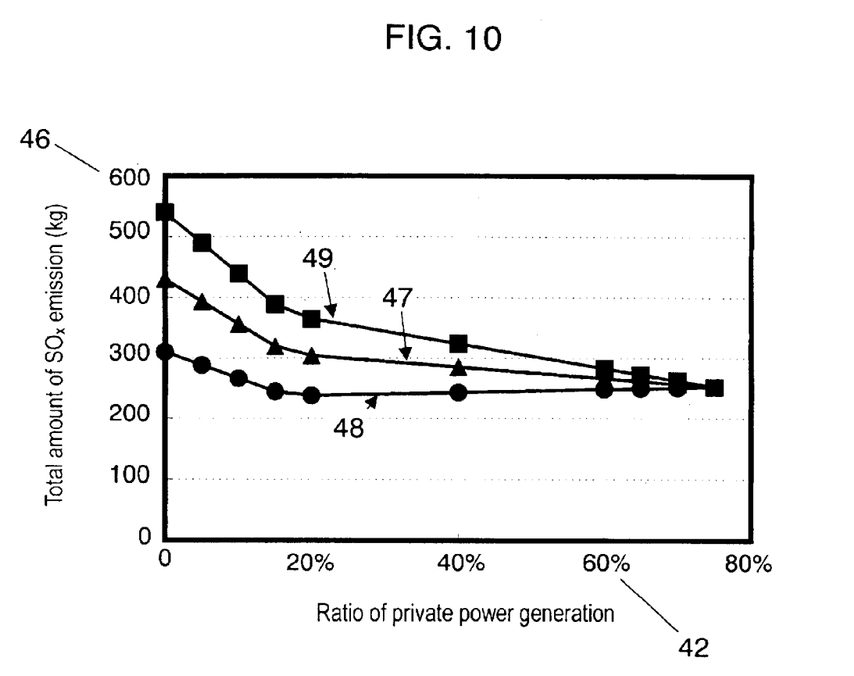
FIG. 10 shows SOx emissions which are compared with the ratio of power of the private generation to power supplied from each of the three electric majors into the cogeneration system.

In FIG. 10, the longitudinal axis shows total amount of SOx emission 46 calculated with a ratio of private power generation, and the horizontal axis shows ratio of private power generation 42 referring to the ratio of private power generation. In the figure, curves 47, 48, and 49 show SOx emissions from SYSTEM using power companies E, F, and G respectively.

The consideration described above implies that SYSTEM is useful means to reduce environmental road. But, consideration on a influence a manufacturing process putting on the environmental makes clear that a use ratio of private power generation depends on a electric power company, from which the manufacturing process purchases electric power, accordingly depends on a location of the manufacturing process. Therefore, the consideration makes clear that a design of a manufacturing process should be reviewed on a location basis of the process.

Figure 11:
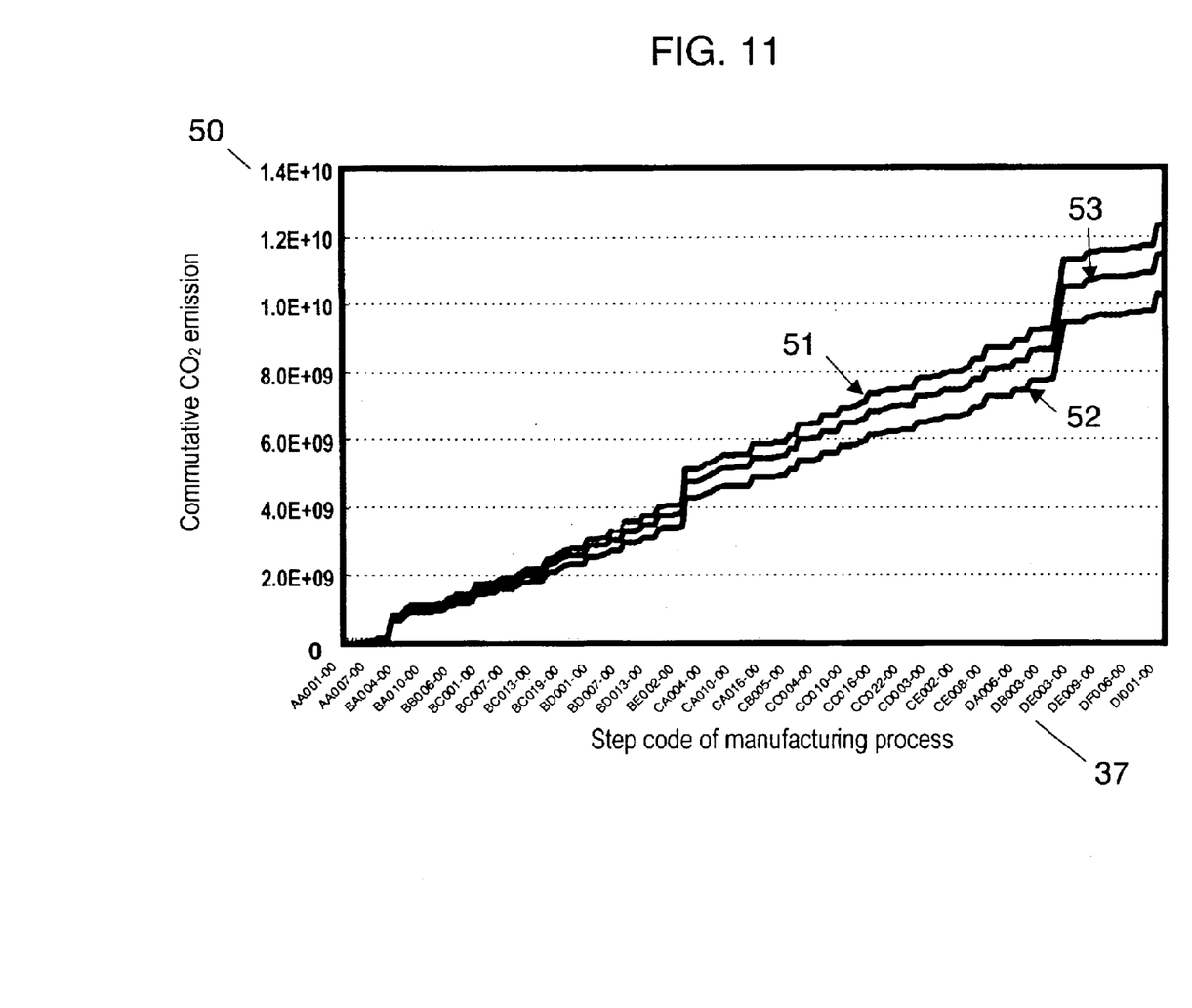
FIG. 11 shows a result in simulation of $CO_2$ cumulative emission with the ratio of the private generation changed.

FIG. 11 shows a result the process assessment tool of the invention calculates with a condition of the manufacturing process and with ratios of private power generation changing. In the figure, the longitudinal axis shows cumulative $CO_2$ emission 50 which is the integral of $CO_2$ emission with respect to step code, and the horizontal axis shows step code 37 referring to the step code. In the figure, ratios of private power generation in SYSTEM are 0%, 20%, and 40%.

In the figure, curves 51, 52, and 53 show ratios 0%, 20%, and 40% of private power generation respectively. FIG. 11 shows that CO2 emissions cumulated with step differ among ratios of private power generation. The figure implies that when SYSTEM is used, an environmental load decreases in a condition that a ratio of private generation is below 20%, and increases in a condition that the ratio is above 20%.

As mentioned above, consideration of environmental load with the process assessment tool of the present invention provides useful information to reduce environmental load.

Real manufacturing processes run not always in a limited location, but in various locations distributed, so that a process assessment for a manufacturing process in the various locations should be able to be performed. This assessment tool: fits this need; can enter a specific location, where a manufacturing process runs, for the process; and can perform a assessment for the process speedily and precisely. As a result, the tool makes easy the assessment of a measure the manufacturing process should take to reduce environmental loads. Furthermore, the tool provides the manufacturing process with a course of reduction of environmental loads in the future.

Furthermore, with these methods stored as a software program, running the program on a computer provides the same functions and result.

As mentioned above, the present invention can provide a guideline for a ratio of private power generation to purchased power to be optimized, and a estimation of energy consumption and emissions such as carbon dioxide, nitrogen oxides, and sulfur oxides.

Furthermore, the present invention can be applied to a manufacturing process having so many steps, and another manufacturing process having steps in various locations distributed, to perform an analysis easily and to show the result visually. Therefore, the invention makes easy an assessment of a measure the manufacturing process for reducing environmental loads.

As a result, the present invention provides a design of the manufacturing process with a course of reduction of environmental loads in the future.

What is claimed is:

1. A process assessment tool for assessing a load a manufacturing process for an industrial product puts on the environment, said process assessment tool comprising:
   (a) a database for inputting and storing data of a first environmental load corresponding to each energy source, whose consumption produces the first environmental load;
   (b) a data input unit, into which data of conditions of said manufacturing process for the industrial product is input;
   (c) a data processing unit using the data entered into said data input unit and the data of the first environmental load stored in said database for calculating a second environmental load in each step of said manufacturing process producing the industrial product, the second environmental load produced when said each energy source consumed in said each step of said manufacturing process; and
   (d) a data output unit for outputting a result said data processing unit calculates.

2. The process assessment tool as defined in claim 1, wherein the energy source is at least one of primary energy sources including natural gas, heavy oil, light oil, lamp oil, gasoline, coal, and wood.

3. The process assessment tool as defined in claim 1, wherein the energy source is at least one of secondary energy sources including electrical power and town gas, the data of the first environmental load is collected based on one of:
   i) energy supplier basis; and
   ii) energy service area basis.

4. The process assessment tool as defined in claim 3, wherein the data of the first environmental load is collected based on:
   (i) power source data collected based on one of energy supplier basis and energy service area basis; and
   (ii) data of a third environmental load based on each power source.

5. A process assessment tool for assessing a load a manufacturing process for an industrial product puts on the environment, said process assessment tool comprising:
   (a) a database for inputting and storing data of a first environmental load produced by consumption of a material;
   (b) a data input unit, into which an amount of consumption of a necessary material for production of the industrial product is entered;
   (c) a data processing unit using the data entered into said data input unit and the data of the first environmental load stored in said database for calculating a second environmental load that each step of the manufacturing process produces when the material is consumed in said each step of the manufacturing process; and
   (d) a data output unit for outputting a result said data processing unit calculates.

6. The process assessment tool as defined in claim 1, wherein the first environmental load includes data of total energy consumed through stages from mining to use of the energy source.

7. The process assessment tool as defined in claim 5, wherein the first environmental load includes data of total energy consumed through stages from mining to use of the energy source.

8. The process assessment tool as defined in claim 1, wherein the first environmental load includes total amount of at least one of environmental load materials, the environmental load materials include carbon dioxide ($CO_2$), nitrogen oxides (NOx), and sulfur oxides (SOx), and are produced through stages from mining to use of the energy source.

9. The process assessment tool as defined in claim 5, wherein the first environmental load includes total amount of at least one of environmental load materials, the environmental load materials include carbon dioxide ($CO_2$), nitrogen oxides (NOx), and sulfur oxides (SOx), and are produced through stages from mining to use of a raw material of the material.

10. The process assessment tool as defined in one of claim 1 and claim 5, wherein said data output unit further shows calculation results for each process, which constitutes said manufacturing process, in a visual form.

11. The process assessment tool as defined in claim 10, wherein said data output unit further shows a second environmental load increasing step by step by undergoing said each process in a cumulative graph.

12. The process assessment tool as defined in claim 10, wherein said each process are divided into classes, said data output unit further shows a second environmental load in a split graph, each part area of the split graph is proportional to amount of the second environmental load of each of the classes.

13. The process assessment tool as defined in claim 10, wherein said data output unit further shows ratios of a plurality of second environmental loads produced in said each process vs. total amount of environmental loads in respective manufacturing process in the graph independently.

14. A method for a process assessment for an industrial product assessing a load a manufacturing process puts on the environment, said method comprising the steps of:
    storing data in a database of a first environmental load corresponding to each energy source whose consumption produces a first environmental load;
    entering a condition of said manufacturing process for the industrial product;
    calculating a second environmental load that each step of said manufacturing process produces when said each energy source is consumed in said each step of said manufacturing process, with the condition and data of the first environmental load stored in said database; and
    displaying a result of said calculating step.

15. The process assessment method as defined in claim 14, wherein the energy source is at least one of primary energy sources which comprises natural gas, heavy oil, light oil, lamp oil, gasoline, coal, and wood.

16. The process assessment method as defined in claim 14, wherein the energy source is at least one of secondary energy sources which comprises electrical power and town gas, the data of the first environmental load is constructed on one of:
    i) energy supplier basis; and
    ii) energy service area basis.

17. The process assessment method as defined in claim 14, wherein the data of the first environmental load is constructed by: (i) power source data collected based on one of energy supplier basis and energy service area basis; and (ii) data of a third environmental load, wherein the data is constructed on power source basis.

18. A method for a process assessment for an industrial product assessing a load a manufacturing process puts on the environment, said method comprising the steps of:
    storing data in a database of a first environmental load corresponding to each energy source whose consumption produces a first environmental load;
    entering an amount of consumption of a necessary material for production of the industrial product;
    calculating a second environmental load that each step of said manufacturing process produces when the material is consumed in said each step of the manufacturing process, with said amount of consumption of the material and data of the first environmental load stored in said database; and
    displaying a result of said calculating step.

19. The process assessment method as defined in claim 14, wherein the first environmental load includes data of total energy consumed through stages from mining to use of the energy source.

20. The process assessment method as defined in claim 18, wherein the first environmental load includes data of total energy consumed through stages from mining to use of the energy source.

21. The process assessment method as defined in claim 14, wherein the first environmental load includes total amount of at least one of environmental load materials, the environmental load materials include carbon dioxide ($CO_2$), nitrogen oxides (NOx), and sulfur oxides (SOx), and are produced through stages from mining to use of the energy source.

22. The process assessment method as defined in claim 18, wherein the data of the first environmental load includes total amount of at least one of environmental load materials, the environmental load materials include carbon dioxide ($CO_2$), nitrogen oxides (NOx), and sulfur oxides (SOx), and are produced through stages from mining to use of a raw material of the material.

23. The process assessment method as defined in one of claim 14 and claim 18, wherein said displaying step further shows calculation results for each process, which constitutes said manufacturing processes, in a visual form.

24. The process assessment method as defined in claim 23, wherein said displaying step further shows a second environmental load in a cumulative graph, the second environmental load increasing step by step by undergoing said each process.

25. The process assessment method as defined in claim 23, wherein said each process divided into classes, said displaying step further shows a second environmental load in a split graph, each part area of the split graph is proportional to amount of the second environmental load of each of the classes.

26. The process assessment method as defined in claim 23, wherein said displaying step further shows a ratios of a plurality of the second environmental loads produced in said each process versus the total amount of environmental loads in respective manufacturing processes in the graph independently.

27. A computer readable storage medium containing program instructions for operating a computer to perform a method for a process assessment, wherein said method assesses a load a manufacturing process puts on the environment said method comprising the steps of:
    storing data in a database of a first environmental load corresponding to each energy source where consumption produces the first environmental load;
    entering a condition of said manufacturing process for the industrial product;
    calculating a second environmental load that each step of said manufacturing process produces when said each energy source is consumed in said each step of said manufacturing process, with the condition and data of the first environmental load stored in said database; and
    displaying a result of said calculating step.

28. The computer readable storage medium as defined in claim 27, wherein the energy source is at least one of primary energy sources which comprises natural gas, heavy oil, light oil, lamp oil, gasoline, coal, and wood.

29. The computer readable storage medium as defined in claim 27, wherein the energy source is at least one of secondary energy sources which comprises electrical power and town gas, the data of the first environmental load is constructed on one of:
    i) energy supplier basis; and
    ii) energy service area basis.

30. The computer readable storage medium as defined in claim 27, wherein the data of the first environmental load is determined on a basis of: (i) power source data collected based on one of energy supplier basis and energy service area basis; and (ii) data of a third environmental load, wherein the data is constructed on power source basis.

31. A computer readable storage medium wherein a method assesses a load that a manufacturing process for an industrial product puts on the environment, said method comprising the steps of:

storing data in a database of a first environmental load produced when a material is consumed;

entering an amount of consumption of a necessary material for production of the industrial product;

calculating a second environmental load that each of said manufacturing process produces when the material is consumed in said each of the manufacturing processes, with the amount of consumption of the necessary material and data of the first environmental load stored in said database; and displaying a result of said calculating step.

32. The computer readable storage medium as defined in claim 27, wherein said computer makes said program perform a method for a process assessment, wherein the first environmental load includes data of total energy consumed through stages from mining to use of the energy source.

33. The computer readable storage medium, as defined in claim 31, wherein the first environmental load includes data of total energy consumed through stages from mining to use of the energy source.

34. The computer readable storage medium as defined in claim 27, wherein the first environmental load includes total amount of at least one of environmental load materials, the environmental load materials include carbon dioxide ($CO_2$), nitrogen oxides (NOx), and sulfur oxides (SOx), and are produced through stages from mining to use of the energy source.

35. The computer readable storage medium as defined in claim 31, wherein the first environmental load includes total amount of at least one of environmental load materials, the environmental load materials include comprises carbon dioxide ($CO_2$), nitrogen oxides (NOx), and sulfur oxides (SOx), and are produced through stages from mining to use of a raw material of the material.

36. The computer readable storage medium as defined in of claim 27 and claim 31, wherein said displaying step further shows calculation results for each process which constitutes said manufacturing processes, in a visual form.

37. The computer readable storage medium as defined in claim 36, wherein said displaying step further shows a second environmental load increasing step by step by undergoing said each process in a cumulative graph.

38. A computer readable storage medium as defined in claim 36, wherein said each process is divided into classes, said displaying step further shows a second environmental load in a split graph, each part area of the split graph is proportional to amount of the second environmental load of each of the classes.

39. A computer readable storage medium as defined in claim 36, wherein said displaying step further shows ratios of a plurality of second environmental loads produced in said each process versus total amount of environmental loads in respective manufacturing processes in the graph independently.

* * * * *